United States Patent [19]

Vukadinovic

[11] 4,289,376
[45] Sep. 15, 1981

[54] LIGHT REFLECTORS

[76] Inventor: Dragan Vukadinovic, 4812 Woodrow Ave., Parma, Ohio 44134

[21] Appl. No.: 61,607

[22] Filed: Jul. 30, 1979

[51] Int. Cl.³ .............................................. G02B 5/12
[52] U.S. Cl. ................................. 350/99; 301/37 SA
[58] Field of Search ................................ 350/99–105, 350/109; 301/37 L, 37 SA, 37 M; D14/30; 138/89.1; 137/231; 40/208, 430 C, 473 C, 480 C, 587 C, 591 C

[56] References Cited

U.S. PATENT DOCUMENTS

| | | | |
|---|---|---|---|
| 1,455,306 | 5/1923 | Reilley et al. | 350/99 |
| 2,063,763 | 12/1936 | Shapera | 350/109 |
| 2,200,167 | 5/1940 | Goldberg | 350/109 |
| 2,202,306 | 5/1940 | Arbuckle | 350/109 |
| 2,467,908 | 4/1949 | Rand | 350/97 X |
| 2,690,094 | 9/1954 | Becker | 350/99 |

Primary Examiner—John K. Corbin
Assistant Examiner—B. Wm. de los Reyes

[57] ABSTRACT

An adjustable light reflector assembly attached to the valve of an automobile tire and secured in place by the valve cap. An assembly consisting of a light reflector housing molded of a plastic material which is screwed onto a die cut metallic strip perforated with a row of equally spaced holes suitably sized to fit around the valve's threaded portion. A light reflector protruding just outside the outermost edge of the tire's sidewall so as to reflect light back at following traffic once during each rotation of the wheel creating a flickering effect whose intervals of brightness vary with the speed of travel.

1 Claim, 4 Drawing Figures

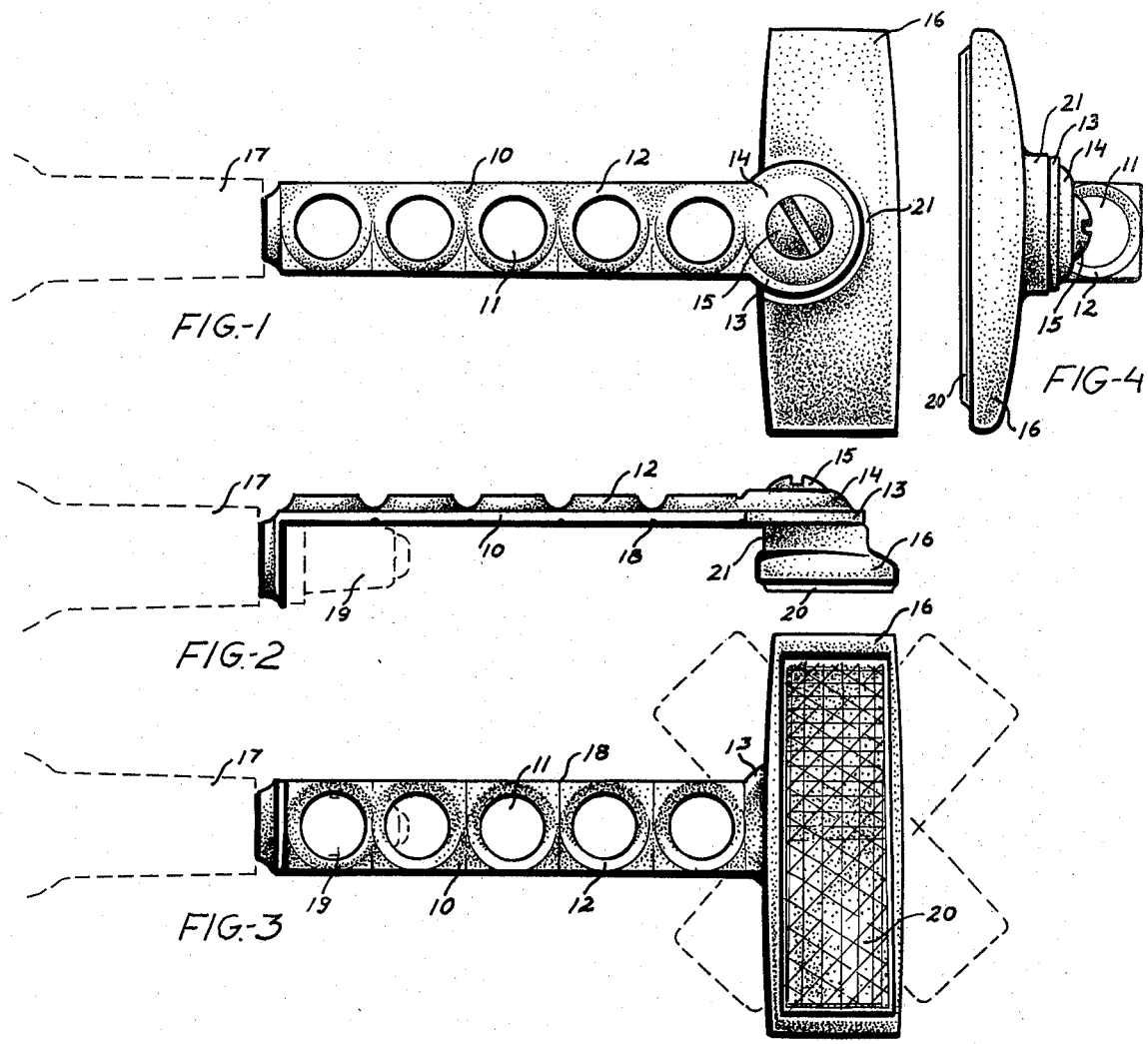

LIGHT REFLECTORS

BACKGROUND OF THE INVENTION (1) Field of the Invention

This invention relates to light reflectors of the usual type and in particular to light reflectors found on automobiles or other such similar vehicles.

(2) Description of the Prior Art

In the usual embodiment light reflectors are molded of a plastic material which is adapted to reflecting light. Light reflectors are customarily provided with various types of housings and attachments each one specialized according to need.

SUMMARY

The object of this invention is to enhance automobile traffic safety at night, by providing a car's rear wheels with light reflectors being situated in such a position so as to reflect light back at following traffic once during each rotation of the tires. In this configuration the light reflectors would make a car more conspicuous to following drivers, by creating a flickering effect whose intervals of brightness would vary with the different speeds of travel.

Another object of this invention is to provide a light reflector with means of attachment, by which it may be secured tightly to all automobile wheels regardless of their type or size, yet still function in the aforesaid manner.

A further object of this invention is to provide a light reflector of the above class whose means of attachment may be adjusted by the user according to need, yet still remain convenient and simple to install.

BRIEF DESCRIPTION OF THE DRAWINGS

FIG. 1 is a back view of the light reflector and its means of attachment;

FIG. 2 is an elevational view of FIG. 1;

FIG. 3 is a front view of FIG. 1; and

FIG. 4 is a side view of FIG. 1.

DESCRIPTION OF THE PREFERRED EMBODIMENTS

The invention will be fully disclosed in the following description taken in connection with the accompanying drawings in which, FIG. 1 depicts a view from the back side of the light reflector and its means of attachment which consists of a die cut metallic strip 10 whose flat side is perforated with a row of holes 11. Surrounding each equally sized and spaced hole 11 is a rim 12 whose sides curve to become integrally formed with the surface of strip 10 giving it a greater thickness. One end of strip 10 is formed into a disc shaped portion 13 having a circular buldge 14 on which a screw 15 is centrally located connecting strip 10 to the light reflector housing 16.

FIG. 2 shows the elevational view of the light reflector assembly as it is attached to a valve 17 of an automobile tire. A section of strip 10 is bent perpendicularly along an indentation 18 so that hole 11 may be slipped onto the threaded portion of valve 17. The whole assembly is tightened into place by screwing on the valve cap 19. In this manner the length of strip 10 may be adjusted accordingly, by bending into place appropriate sections and cutting off the excess segment so as to allow the light reflector 20 to protrude just outside the tire's sidewall. This measurement varies depending upon the length of valve 17 and its position on the wheel respectively.

FIG. 3 shows the front view of strip 10 whose breadth is spanned by indentations 18, which are equidistantly spaced between holes 11 and tangent to the base of rims 12 creating square sections, which as a result may be more easily bent or cut. FIG. 3 also shows light reflector 20 which is fitted onto a rectangularly shaped housing 16 molded of a durable plastic material, and which may be adjusted pivotally along the axis of screw 15. Ideally, the light reflector 20 and its housing 16 should be adjusted so that their longer side is parallel to the outermost edge of the tire's sidewall before being tightened in place by screw 15.

FIG. 4 depicts the side view of the light reflector 20 and the upright cylindrical portion 21 centrally located along the longer side, while being off center along the shorter side of housing 16. Furthermore, the entire assembly may be pivotally adjusted along the axis of the valve 17 before being tightened in place by valve cap 19. Ideally, the light reflector housing 16 should be aligned with the diameter of the tire, so that when valve 17 is closest to the street the light reflector 20 will be facing toward the back of the car and producing flashes of light relatively removed from the automobiles' other illuminations. Provisions of other means for the attachment of light reflectors to a tire are possible without departing from the scope of the invention as determined by the following claims.

Having described the invention what is claimed is:

1. A light reflector assembly adapted to be attached to the valve of an automobile tire and secured in place by the valve cap; said light reflector assembly comprising:

a metallic strip of predetermined length having a series of equally sized and spaced holes therethrough, said holes having rims integral with the surface of said strip;

a plurality of linear indentations spanning the breadth of said strip, located between said holes and adjacent to said rims;

a segment at one end of said strip, perpendicularly bent therefrom, having a hole suitably sized to receive the threaded portion of said valve;

a disk-shaped portion at the other end of said strip, integral with said strip, having a centrally located screw therethrough, said screw connecting said strip to the back of a substancially rectangular plastic light reflector housing, said housing having a correspondingly shaped and sized light reflector situated therein.

* * * * *